US012579291B2

(12) United States Patent
Faga

(10) Patent No.: US 12,579,291 B2
(45) Date of Patent: Mar. 17, 2026

(54) SYSTEMS AND METHODS FOR ADAPTIVE DIGITAL REINFORCEMENT LEARNING

(71) Applicant: FirstWork LLC, McLean, VA (US)

(72) Inventor: Patrick Faga, McLean, VA (US)

(73) Assignee: FirstWork LLC, Mclean, VA (US)

( * ) Notice: Subject to any disclaimer, the term of this patent is extended or adjusted under 35 U.S.C. 154(b) by 272 days.

(21) Appl. No.: 18/305,064

(22) Filed: Apr. 21, 2023

(65) Prior Publication Data

US 2023/0351038 A1    Nov. 2, 2023

Related U.S. Application Data

(60) Provisional application No. 63/337,349, filed on May 2, 2022.

(51) Int. Cl.
    *G06F 21/62*        (2013.01)
    *G06N 3/092*        (2023.01)
(52) U.S. Cl.
    CPC ......... *G06F 21/6218* (2013.01); *G06N 3/092* (2023.01); *G06F 2221/2137* (2013.01); *G06F 2221/2141* (2013.01)
(58) Field of Classification Search
    USPC .......................................................... 726/27
    See application file for complete search history.

(56) References Cited

U.S. PATENT DOCUMENTS

| 6,139,330 | A | 10/2000 | Ho et al. |
| 11,087,634 | B2 | 8/2021 | Chambers |

| 2009/0300671 | A1* | 12/2009 | Scott | H04L 9/3226 |
| | | | | 725/27 |
| 2015/0288721 | A1* | 10/2015 | Lemon | H04L 63/102 |
| | | | | 726/1 |
| 2017/0104839 | A1* | 4/2017 | Starsinic | H04W 40/34 |
| 2017/0178526 | A1 | 6/2017 | Grimes et al. | |
| 2017/0178531 | A1 | 6/2017 | Swank et al. | |
| 2020/0410895 | A1* | 12/2020 | Yakiwchuk | G10L 15/22 |
| 2022/0398569 | A1* | 12/2022 | Xavier | G06Q 10/06398 |

OTHER PUBLICATIONS

Screen Time Parental Control Review—Educational App Store. retrieved Apr. 13, 2022. <https://www.educationalappstore.com/app/screen-time-parental-control>.

* cited by examiner

*Primary Examiner* — Sanchit K Sarker

(74) *Attorney, Agent, or Firm* — Duane Morris LLP

(57)        ABSTRACT

A method of adaptive reinforcement learning includes creating a parent user account associated with a digital reinforcement learning application of a computing device; creating a child user account associated with the digital reinforcement learning application; restricting content of the child user account; delivering content on the computing device to a child user of the child user account; tracking time via the digital reinforcement learning application that the child user account accesses delivered content; locking out access to restricted content of the delivered content when a time threshold of the child user account has expired; and redirecting delivered content to a learning task provided via the digital reinforcement learning application.

15 Claims, 6 Drawing Sheets

250

250

300

400

SYSTEMS AND METHODS FOR ADAPTIVE DIGITAL REINFORCEMENT LEARNING

CROSS REFERENCE TO RELATED APPLICATIONS

This application claims the benefit of U.S. Provisional Patent Application No. 63/337,349, filed May 2, 2022, which is hereby incorporated by reference for all purposes as if fully set forth herein.

BACKGROUND

Digital learning tools teach early topical skills to children trying to develop them. Conventional tools can include applications with learning tasks that deliver the tasks through digital flash cards (e.g. Quizlet, ABA tools, Vizzle, others) or other forms of digital learning tasks. These tasks are generally not reinforced (i.e., paired with a positive stimulus). Though, some forms of reinforcement for tasks can be provided via gamification, competitive scores, and other mechanisms.

Conventional learning tools have a curriculum, deliver the curriculum, track progress, and potentially provide internal rewards. For example, rewards can include feedback such as reporting "Congrats!!" or allow for play of a game after answering posed questions correctly.

The problem is that conventionally digital task delivery requires instructor support or intrinsic motivation on the part of a child/learner. Additionally, conventional products do not combine conditional entertainment application lockout with learning tasks. Reinforcement learning loops allows users to learn without needing support from any instructors.

SUMMARY

Digital Reinforcement learning uses digital task delivery but provides strong reinforcement by restricting access to pre-selected entertainment applications until learning lessons are completed. Digital Reinforcement learning starts with using a feature like 'parental control' to select certain applications (e.g. video libraries, games, social media) which are used for entertainment. These applications can be put on a timer and when time has expired, they are locked until the user/learner completes learning tasks in the digital reinforcement learning application. Tasks are personalized to a user based on their progress in curriculums. The amount of time the applications are locked and the amount of tasks each user completes is also personalized via a learning efficiency algorithm that tailors the lockout to an optimal performance level.

Digital Reinforcement Learning has a curriculum and pre-selected applications deemed entertaining, locks out entertaining applications during use, provides prompts to navigate to learning task applications, delivers learning tasks from the curriculum, provides internal rewards, and provides external rewards by allowing access to entertainment application previously locked out.

Digital Reinforcement Learning Technology (Digital RL) conditionally restricts access to smart device applications deemed 'entertaining,' users can end conditional application lockout by completing personalized learning tasks. As alluded to above, this technology requires two 'user' accounts per learner, one account which is supervisory, the other account is the user or learner account, which is subject to conditional application restriction. A parent/therapist/teacher running the supervisory account can pre-select which applications are entertaining or otherwise restricted on the 'learner' account. This administrative account will also set general limitations on application use time (i.e., 3 hours per day maximum) after which restricted applications are locked. After the administrator has set up the learner's account, the learner's smart device becomes subject to conditional application restriction. While the learner is using their device, Digital RL tracks the amount of time the user is spending in restricted applications. When an algorithmically determined use time threshold is breached, the restricted applications become locked. Users will then be prompted to redirect to an application where they must complete learning tasks before gaining permission to access the restricted applications. If a learner exits the learning application before completing the determined number of tasks, their restricted applications will remain locked. Upon completion of a certain number of algorithmically determined questions (based on progress in a curriculum) users will be notified their restricted applications are unlocked. This process can repeat until a user has spent their allocated time on restricted applications for the day (i.e., the 3 hours per day.)

As described in more detail below, embodiments of the present disclosure: (i) Conditionally restrict selected applications until a user completes learning tasks, (ii) Unconditionally restrict total application use time on a daily basis, (iii) Redirect users directly from a restricted application to a learning task, (iv) Algorithmically optimizes, for each learner/user, an amount of restricted application use time and learning tasks to optimize learning efficiency, (v) Algorithmically optimizes, for each leaner/user, an amount of learning tasks displayed per trial period to optimize learning efficiency, (vi) Contains three user account types which interact with one common curriculum, (vii) Presents tasks using and error-free learning model to provide increasingly simple versions of a question after incorrect responses through prompting and highlighting so learner/users can end a trail with a 'correct' response, (viii) Tracks learner/user progress in a learning curriculum, (ix) Tracks learner/user learning task response time, (x) Tracks user learning accuracy rate, (xi) Allows 'administrators' to deliver learning tasks, (xii) Allows 'administrators' to view 'learner' entertainment application use patterns and learning progress, (xiii) Analyzes learner/user data and generates learning progress report and learning process insights, and (xiv) Assesses user mastery of topics based on pre-set mastery criteria.

Disclosed Digital Reinforcement Technology harnesses the power of smart devices to address learning deficiencies and excessive technological consumption of entertainment or "fun applications" to promote skill building, knowledge acquisition, reinforcement of learning, and limit learning regression utilizing devices that would otherwise be used for entertainment purposes. Digital tasks are combined with conditional application restriction to create a reinforcement learning loop. Entertainment applications are usually not intrinsically motivating where digital reinforcement learning leverages the use of other applications of the device as reinforcement.

According to an embodiment, a method of adaptive reinforcement learning includes creating a parent user account associated with a digital reinforcement learning application of a computing device; creating a child user account associated with the digital reinforcement learning application; restricting content of the child user account; delivering content on the computing device to a child user of the child user account; tracking time via the digital reinforcement learning application that the child user account accesses delivered content; locking out access to restricted content of the delivered content when a time threshold of the child user account has expired; and redirecting delivered content to a learning task provided via the digital reinforcement learning application.

In an aspect, the restricting content of the child user account is performed via the parent user account.

In an aspect, the restricting content of the child user account is performed algorithmically.

In an aspect, the method further includes generating a notification to the child user account when the delivered content has been restricted.

In an aspect, the method further includes unlocking access to the restricted content after completion of the learning task.

In an aspect, the learning task is completed when a predetermined number of questions have been answered via the digital reinforcement learning application. In an aspect, the predetermined number of questions is determined based on progress in a curriculum within the digital reinforcement learning application. In an aspect, the progress in the curriculum is determined based on efficiency of completion of answered questions in the digital reinforcement learning application.

In an aspect, the learning task is an error-free learning task where only correct answers to questions is allowed. In an aspect, each incorrect answer to a question is sequentially removed until only a correct answer remains.

In an aspect, the method further includes monitoring progress of the learning task to determine a number of times an incorrect answer is removed from a question before a correct answer is selected.

In an aspect, the method further includes automatically adjusting the learning task based on progress within a learning curriculum of the child user.

In an aspect, the method further includes tracking one of child user progress within a learning curriculum, learning task response time, and learning accuracy rate.

In an aspect, the method further includes analyzing child user data, the child user data including at least one of: time of day learning tasks are completed, learning task length, learning task question types, number of questions of the learning task, and number of possible answers to questions of the learning task.

In another embodiment, a system for digital reinforcement learning includes processing circuitry; and a neural network embedded in an application running via the processing circuitry and trained for adaptive digital reinforcement learning, wherein the neural network is pre-trained on mock data-sets imitating a real learner's data set and further trained on real data sets with known learning outcomes.

In an aspect, the neural network is configured to receive a plurality of digital learning processes and flows and performs the adaptive digital reinforcement learning to analyze a user's prior performance to generate a recommended lesson for the user.

In another embodiment, a non-transitory computer-readable storage medium includes executable instructions that when executed by a processor cause the processor to perform: creating a parent user account associated with a digital reinforcement learning application of a computing device; creating a child user account associated with the digital reinforcement learning application; restricting content of the child user account; delivering content on the computing device to a child user of the child user account; tracking time via the digital reinforcement learning application that the child user account accesses delivered content; locking out access to restricted content of the delivered content when a time threshold of the child user account has expired; and redirecting delivered content to a learning task provided via the digital reinforcement learning application.

In an aspect, the processor is further caused to perform automatically adjusting the learning task based on progress within a learning curriculum of the child user.

In an aspect, the processor is further caused to perform unlocking access to the restricted content after completion of the learning task.

In an aspect, the learning task is an error-free learning task where only correct answers to questions is allowed.

The above and other features, elements, characteristics, steps, and advantages of the present invention will become more apparent from the following detailed description of preferred embodiments of the present invention with reference to the attached drawings.

BRIEF DESCRIPTION OF THE DRAWINGS

The features and advantages of the present invention will be more fully disclosed in, or rendered obvious by the following detailed description of the preferred embodiments, which are to be considered together with the accompanying drawings wherein like numbers refer to like parts and further wherein.

DETAILED DESCRIPTION

Figure 1:
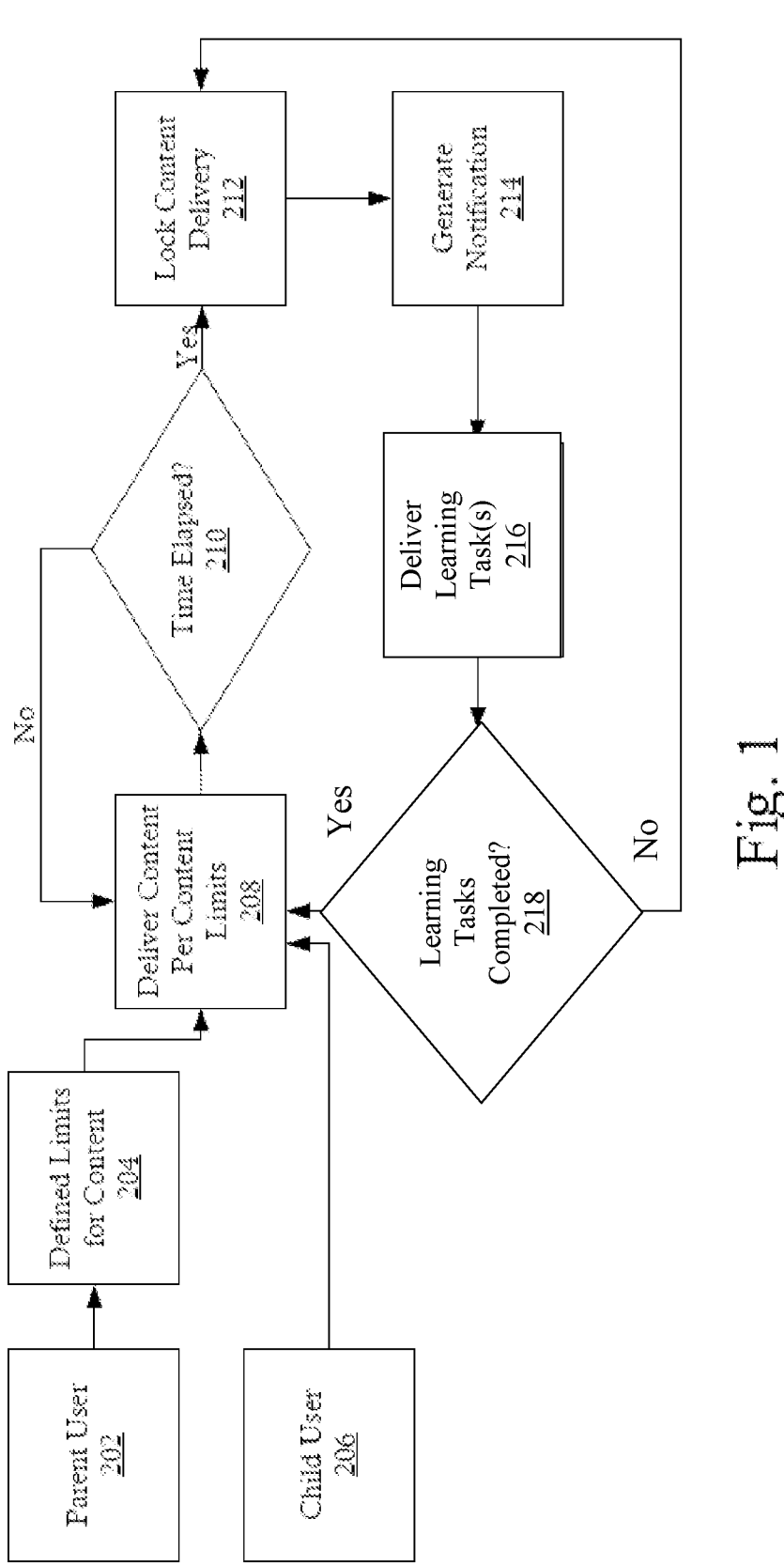
FIG. 1 is a flowchart illustrating a method of digital reinforcement learning, in accordance with some embodiments.

This description of the exemplary embodiments is intended to be read in connection with the accompanying drawings, which are to be considered part of the entire written description.

In the following, various embodiments are described with respect to the systems as well as with respect to methods. Features, advantages or alternative embodiments herein can be assigned to the other objects and vice versa. In other words, the systems can be improved with features described in the context of the methods. In this case, the functional features of the method are embodied by objective units of the systems.

Furthermore, in the following, various embodiments are described with respect to methods and systems for adaptive digital reinforcement learning. Features, advantages or alternative embodiments herein can be assigned to the other objects and vice versa. In other words, methods and systems for training a neural network for adaptive digital reinforcement learning can be improved with features described in the context of the methods and systems for adaptive digital reinforcement learning, and vice versa.

In general, a trained function mimics cognitive functions that humans associate with other human minds. In particular, by training based on training data the trained function is able to adapt to new circumstances and to detect and extrapolate patterns.

In general, parameters of a trained function can be adapted by means of training. In particular, a combination of supervised training, semi-supervised training, unsupervised training, reinforcement learning and/or active learning can be used. Furthermore, representation learning (an alternative term is "feature learning") can be used. In particular, the parameters of the trained functions can be adapted iteratively by several steps of training.

In particular, a trained function can include a neural network, a support vector machine, a decision tree and/or a Bayesian network, and/or the trained function can be based on k-means clustering, Qlearning, genetic algorithms and/or association rules. In particular, a neural network can be a deep neural network, a convolutional neural network or a convolutional deep neural network. Furthermore, a neural network can be an adversarial network, a deep adversarial network and/or a generative adversarial network.

In various embodiments, digital reinforcement learning technology (Digital RL) is implemented to conditionally restrict access to electronic content based on completion of predetermined learning tasks. A Digital RL process can be configured to restrict access to certain content, i.e., "entertainment" content, such as, for example, entertainment applications, games, videos, music, social media, etc. that can be accessed with an electronic device, such as a smartphone, computer, tablet, etc. A user, such as a target of the reinforcement learning, can end a conditional application lockout by completing one or more personalized learning tasks. The Digital RL process is configured to combine digital learning tasks with conditional content restriction to create a reinforcement learning loop. For example, the Digital RL process gates restricted content, which is typically not intrinsically motivating (e.g., does not provide tasks for completion that are personally rewarding), behind completion of digital learning tasks, using access to restricted content as motivation for completion of digital learning tasks.

FIG. 1 is a flowchart 200 illustrating a process of Digital RL, in accordance with some embodiments. The illustrated process 200 conditionally restricts access to restricted content (e.g., entertainment applications) unless and until a child/learner user completes one or more learning tasks. In addition, the illustrated process 200 can include a global limit for access to restricted content.

In some embodiments, the Digital RL process includes at least two accounts each having a different role or permission level with respect to the Digital RL process. A first user account, referred to herein as a "parent" user account 202, is configured for pre-selection of restricted content, i.e., identification of applications, entertainment content, etc. that is restricted for the second user account, referred to herein as a "child" user account 206. Although the terms "parent" and "child" are used to refer to the various accounts, it will be appreciated that these terms are used consistent with their use in computer technology, in which a "parent" process imposes certain controls or has certain rights over a "child" process. While a "parent" user of the parent user account 202 can indeed be a parent of the "child" user, the "parent" user can also include a teacher, therapist, caregiver, or any suitable individual that is in a position to set restrictions and/or learning requirements with respect to the "child" user. Similarly, while the "child" user of the child user account 206 can be a child of the "parent" user, the "child" user 206 can also be a student, client, ward, or any other suitable individual that is in a position to have restrictions and/or learning requirements set by the "parent" user.

In some embodiments, the parent user account 202, e.g., a user account associated with the parent user, is configured to set general limitations 204 on content, such as limitations on restricted content use time. For example, a parent user can use the parent user account 202 to designate that a user (i.e., a child or learner) of the child user account 206 can access restricted content delivered via an application for a limited period of time, for example, such as 3 hours per day maximum, after which all restricted content is inaccessible (e.g., locked). After the parent user has configured content restrictions via the parent user account 202, one or more devices accessed with the child user account 206 become subject to conditional entertainment application restriction. Parent users have control over which applications are restricted, when they are restricted, and the conditions for lifting that restriction (i.e., how many questions a child user has answer, what those questions are, etc.)

When a child user accesses a device, such as, for example, by logging onto a computer and/or using a device associated with the child user account 206, restricted content 208 is provided via the device and a Digital RL process is implemented to track an amount of time the child user spends viewing or using restricted content. Restricted content includes applications designated by the parent user account 202 to have restrictions by use of the device(s) associated with the child user account 206. The restricted content can be to applications that are typically associated with being entertaining like streaming or gaming applications, though, parent users have the latitude to select applications that are not labeled as 'entertaining' like educational applications or the 'photos' library.

When a use time threshold 210 is reached, the Digital RL process locks 212 restricted content on the device in use. The use time threshold can be preset (e.g., determined by the parent user) and/or can be algorithmically determined (e.g., determined based on prior learning task success). The use time threshold can be less than the maximum time threshold set by the parent user. The system uses unsupervised algorithmic determination (Agglomerative Hierarchical Clustering) to assess child user account 206's performance history to make a complex assessment about an ideal length of learning experience in terms of number of questions asked, difficulty of learning experience in terms of learning target or number of answer options, and other factors that may inform learning success such as the time of day.

After the Digital RL restricts access to restricted content, the Digital RL process generates a notification 214 (or prompt) that redirects the device to one or more learning tasks 216. The prompt can be a text box which appears over restricted content or a restricted application which has run out of use time. The notification is to the child user in the sense that the child user is the one who responds to it. Non-restricted content can still be used (i.e., the phone function or an application which was not selected by the parent user as being restricted).

Figure 2:
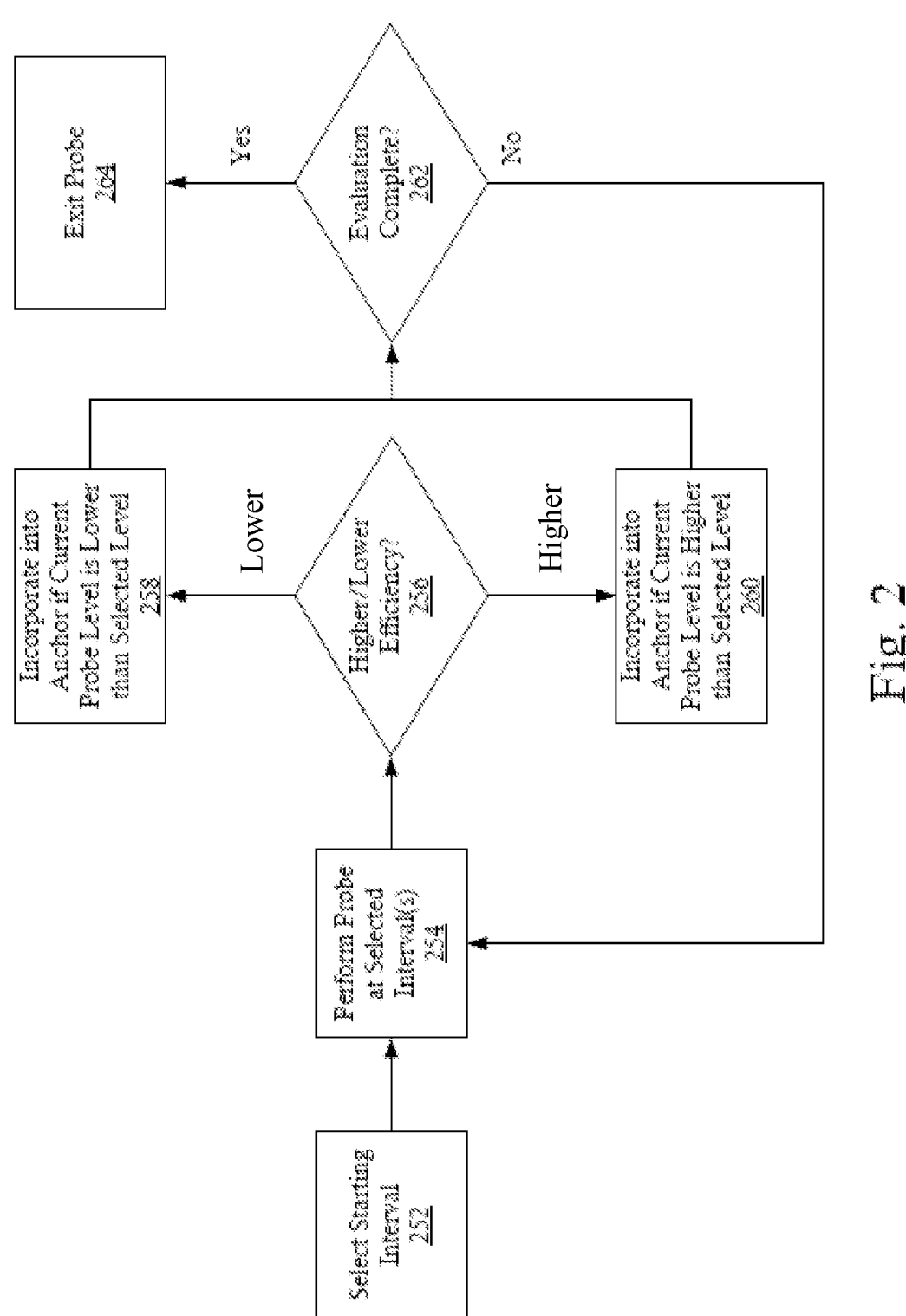
FIG. 2 is a flowchart illustrating a method of adaptive reinforcement learning and assessment, in accordance with some embodiments.

The learning tasks can include any suitable learning tasks, such as, for example, cognitive, emotional, social, behavioral, etc. In some embodiments, a level of learning task provided is determined by a probing process, such as illustrated in FIG. 2. A determination 218 is made as to whether to the learning tasks have been adequately completed. Adequate completion means that the child user has submitted a final response to every question posed during the lesson. For instance, if ten questions are asked, completion is reached upon submitting a final answer to the last question, number 10. Digital RL uses errorless-learning, therefore each 'final attempt' is the correct answer to a given question. Upon completion of a predetermined number of algorithmically determined questions and/or after a predetermined time period within the learning tasks, the restricted content is unlocked 208. The number of questions and/or time within the learning tasks can be determined, for example, based on progress in a curriculum. The restricted content can remain unlocked for the use time threshold, at which point the Digital RL process again restricts the content and requires completion of learning tasks. This process can repeat until the maximum period of time for accessing restricted content. If a determination is made that the digital learning tasks were not successfully completed (e.g., if a child user quits the digital learning tasks before completing all questions), the restricted content remains locked. After the learning lesson is completed, when the child/learner has submitted a response to all questions asked, then the child/learner regains normal access to their device.

FIG. 2 is a flowchart 250 illustrating a method of adaptive reinforcement learning and assessment, in accordance with some embodiments. As shown in FIG. 2, an initial starting level 252 is assigned for learning tasks. FIG. 2 refers to a process by which one can determine an optimal length of content restriction and learner performance on the curriculum to establish a baseline for further improvement for the process described with respect to FIG. 1. The baseline can be established via a system of probe trials and benchmarking aimed at finding the most efficient learning lesson setup at any given time. The initial starting level, step 252, can be selected by a parent user and/or determined algorithmically (e.g., by a trained machine learning process). Parent users can elect to start this process by launching a lesson. Lessons launched previously are viewed as probes which can serve as indices of performance using various lesson settings whether the lesson was delivered algorithmically or manually. These settings are analyzed and an algorithmically determined ideal lesson is populated if parent users select a 'generate insight' button before launching a lesson. Lessons run previously serve as probes which are used to inform ideal performance at this time of day given prior performance.

An evaluation or probe process, step 254, is executed, such as when a user time threshold 210 is reached, as discussed above with respect to FIG. 1. The probing process presents learning tasks and determines whether the efficiency of completion of the assigned learning tasks is higher or lower than a current baseline value, step 256. Efficiency of completion is defined by correct first attempts per period of time, for example, under these settings it is predicted if the child user will submit a correct response 20 times in the next 30 minutes as opposed to 14 times. Baselines are derived from average performance on previous lessons at a similar time on other days. If the efficiency is higher than a current baseline, the Digital RL process can be "re-anchored" to a higher level, step 260, e.g., can have a higher level of questions assigned for subsequent learning tasks. A higher level of questions can be those having either a more difficult lesson by asking more questions or including more answer options, and/or by including questions the child user is less familiar with and thus, less likely to answer correctly. Similarly, if the efficiency is lower than a current baseline, the Digital RL process can be re-anchored to a lower level, step 258, e.g., can have a lower level of questions assigned for subsequent learning tasks. Additional criteria can be used to determine whether to apply a re-anchoring process, such as, for example, whether the efficiency is higher than prior "high" efficiency scores, lower than prior "high" efficiency scores, etc. The process of anchoring and evaluation can be fluid where learning attempts, for example all learning attempts, can serve as 'probes' of learning efficiency under different parameters, to determine if evaluation is complete, step 262. This information can be used to populate an ideal learning lesson where a new learning lesson can be launched.

Figure 3:
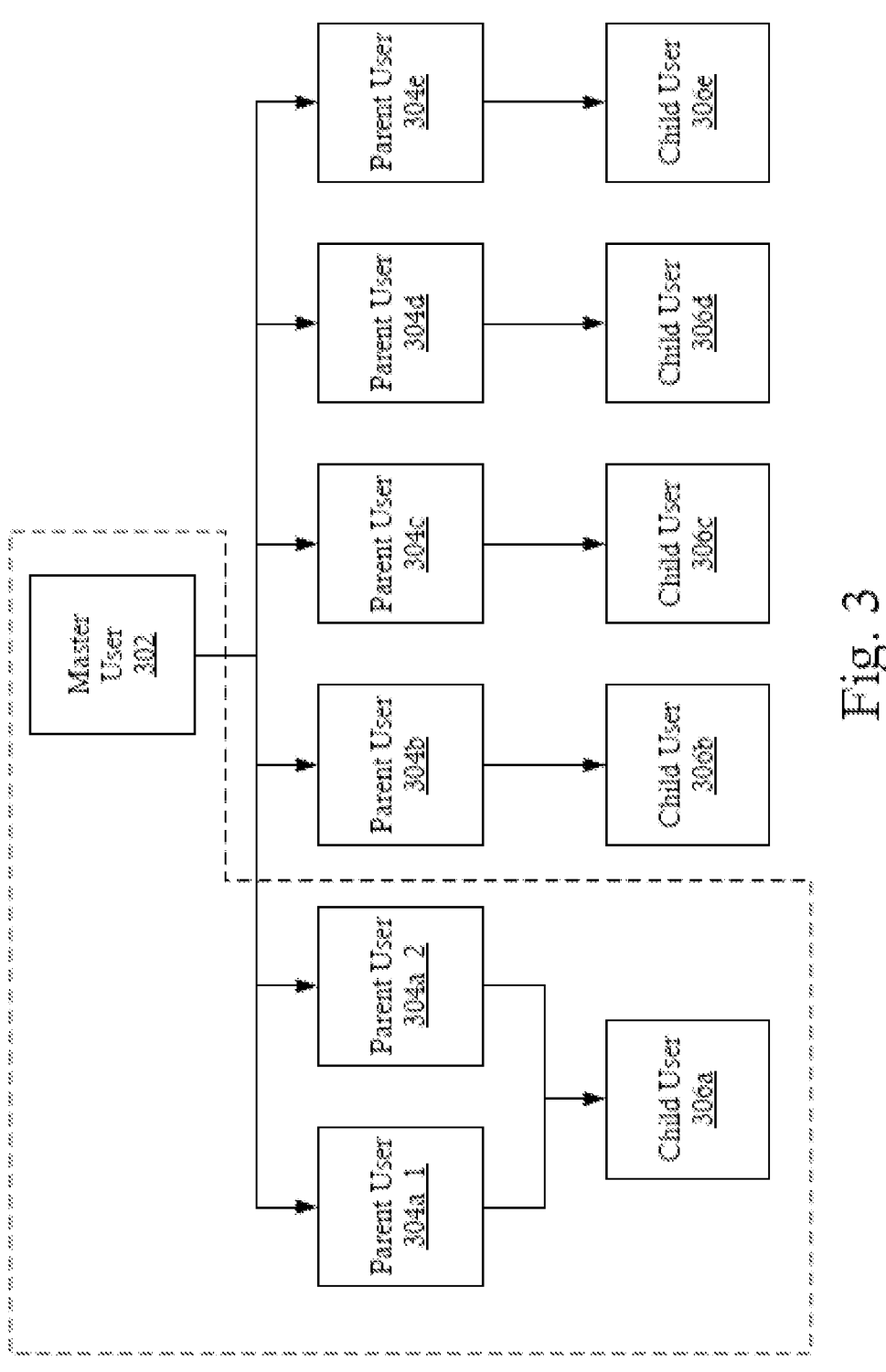
FIG. 3 is a flowchart illustrating user relationships, in accordance with some embodiments.

FIG. 3 is a flowchart 300 illustrating user relationships, in accordance with some embodiments. As shown in FIG. 3, in some embodiments, an additional "master" user 302 can be introduced. The master user 302 can include a user configured to set default restrictions for multiple parent and/or child user accounts. A master user 302 can be associated with an individual who implements learning tasks for multiple individuals, such as, for example, a therapist, teacher, etc. The master user 302 can determine default settings for Digital RL processes implemented for multiple child users 306a-306e. One or more parent users 304a-304e can be configured to adjust the default Digital RL process provided by the master user 302. As illustrated in FIG. 3, in some embodiments, multiple parent users 304a_1, 304a_2 can be configured to adjust settings for a single child user 306a.

Figure 4:
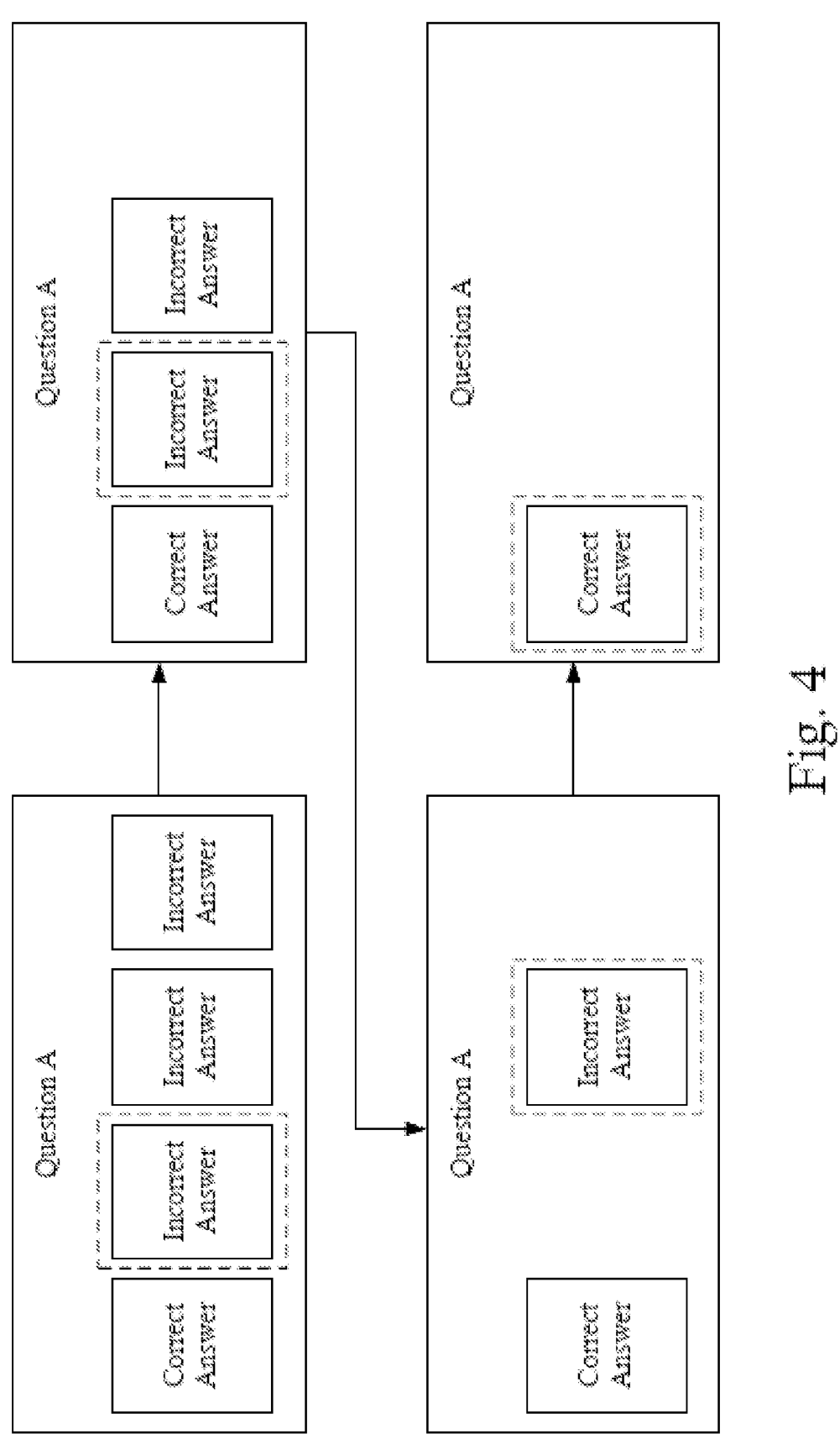
FIG. 4 is a process flow illustrating a process of error-free learning, in accordance with some embodiments.

FIG. 4 is a process flow 400 illustrating a process of error-free learning, in accordance with some embodiments. Errorless learning is present in the questions generated. It is a format that has incorrect answers 'drop out' after being selected. Eventually the only answer left will be the correct answer. This is relevant when determining efficiency and correctness as a 'correct' answer requires finding the appropriate response on the first try, not on subsequent trials. Finding the answer in more than one attempt is considered 'incorrect' but can still be factored into analysis surrounding performance by tracking when the correct answer was inputted and using that as a proxy. In some embodiments, during a digital learning task, the Digital RL process can be configured to implement error-free learning. Error-free learning implements a learning mechanism in which only success (e.g., correct answers) is allowed. Errorless learning mitigates user frustration as a user can never become 'stuck' on a question in which they do not know the answer. Further, errorless learning enables pairing of reward (i.e., reinforcement) with submitting a correct answer every time a question is posed. Further, errorless learning is a common approach to instruction in special education contexts allowing learners to easily transition to using this tool.

As shown in FIG. 4, in some embodiments, a digital RL process can include error-free learning tasks that presents increasingly simple versions of a question after incorrect responses through prompting and highlighting so users always end with a 'correct' response. For example, as illustrated, each incorrect answer to Question A can be sequentially removed until only a correct answer remains. Once the correct answer is selected, the learning task is considered complete. The efficiency rate, e.g., the number of times an incorrect answer is removed before the correct answer is selected, can be monitored by the Digital RL process to allow adjustment of learning tasks in current or subsequent learning task processes.

In various embodiments, a Digital RL process can be configured to algorithmically (e.g., through traditional algorithms, machine learning, artificial intelligence, neural networks, etc.) optimize an amount of time spent viewing restricted content as compared to frequency and time spent performing a learning task to optimize learning efficiency and optimize the number of learning tasks displayed per probe (e.g., trial) period to optimize learning efficiency. As discussed above, a Digital RL process can include two or more user accounts, such as: a master user configured to set default options, generate learning tasks, generate learning curriculum, etc.; a parent user configured to set child user specific restrictions and/or learning tasks; and a child user configured to access restricted content and perform learning tasks.

In various embodiments, a Digital RL process can be configured to track child user progress within a learning curriculum, learning task response time, learning accuracy rate, and/or other metrics. The Digital RL process can be configured to automatically or manually adjust learning tasks, restricted content, and/or use times. In some embodiments, parent and/or master users can be configured to deliver learning tasks to the child user, can view use patterns and learning progress of associated child accounts, etc. The Digital RL process can be configured to analyze child user data, such as ideal time of day to learn, ideal lesson length, ideal question type(s) and differential areas of strength, ideal quantity of questions to ask, ideal amount of answer options to provide, and ideal amount of 'reward time per lesson' and generate learning progress reports and learning process insights, allow master of topics based on pre-set mastery criteria, and/or provide any additional required assistance for implementing a Digital RL process.

In various embodiments, the Digital RL process can provide control features for conditionally controlling access to restricted content based on completion of learning tasks and/or based on use limits. The Digital RL process can include a personalized learning algorithm tailored to an individual associated with the child user to maximize performance in the learning tasks. The Digital RL process can include gamification features, such as a built in token board, to provide additional tracking and/or motivation for completion of digital learning tasks. The Digital RL process can organize data on interactions with the digital learning tasks, generate a learning report, provide progress towards mastery criteria established for various tasks, etc. User interfaces can be provided based on user types, e.g., master, parent, child, etc., which can allow different users to interact with the Digital RL process based on permission levels. For example, a master user can be provided with an interface for displaying all learning tasks, curriculums, etc., while a child user can be restricted to only those learning tasks currently assigned/appropriate based on prior interactions with digital learning tasks.

Figure 5:
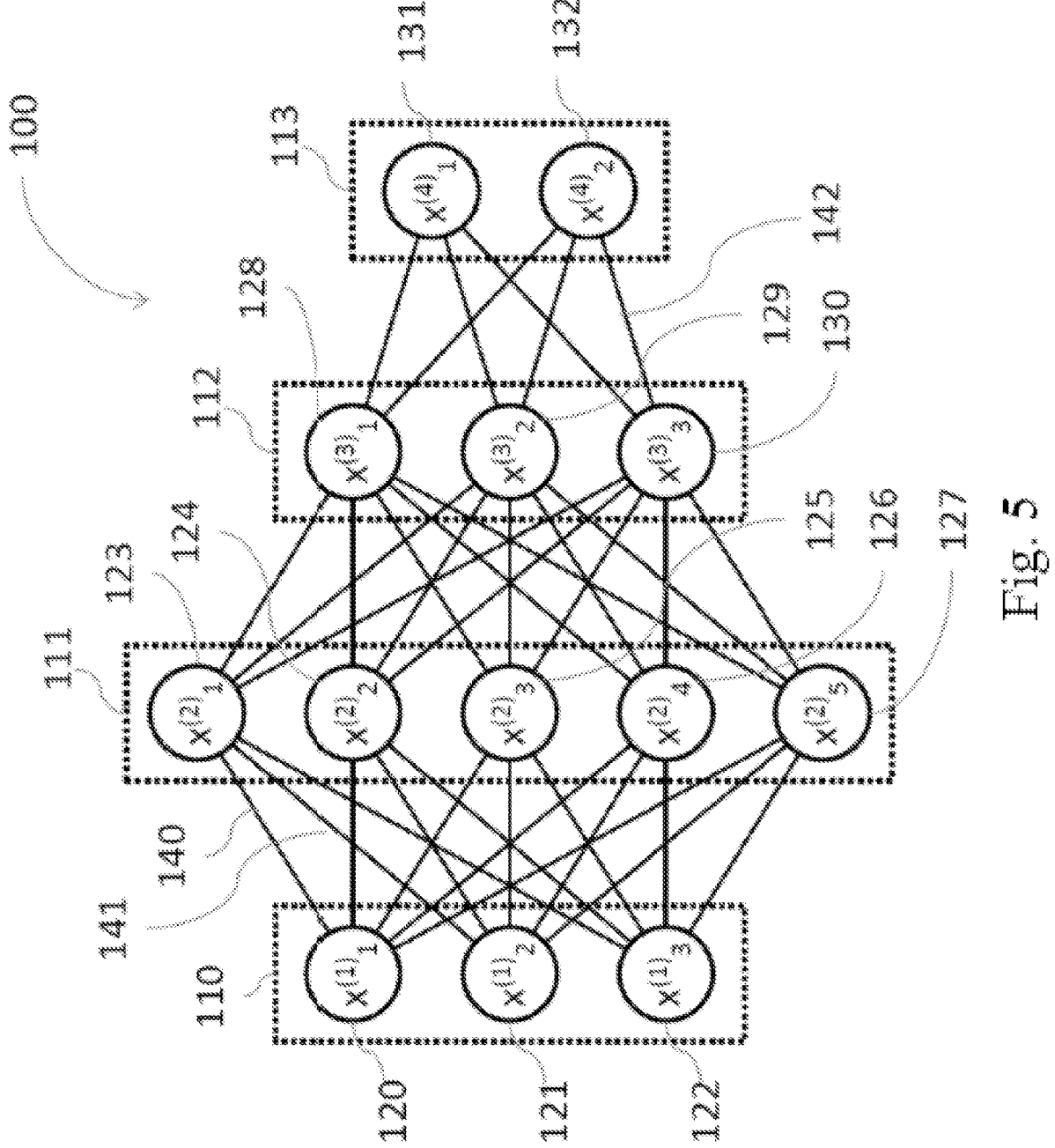
FIG. 5 illustrates an embodiment of an artificial neural network, in accordance with some embodiments.

FIG. 5 displays an embodiment of an artificial neural network 100. Alternative terms for "artificial neural network" are "neural network," "artificial neural net," "neural net," or "trained function." The artificial neural network 100 can include nodes 120-132 and edges 140-142, wherein each edge 140-142 is a directed connection from a first node 120-132 to a second node 120-132. In general, the first node 120-132 and the second node 120-132 are different nodes 120-132, although it is also possible that the first node 120-132 and the second node 120-132 are identical. For example, in FIG. 5 the edge 140 is a directed connection from the node 120 to the node 123, and the edge 142 is a directed connection from the node 130 to the node 132. An edge 140-142 from a first node 120-132 to a second node 120-132 is also denoted as "ingoing edge" for the second node 120-132 and as "outgoing edge" for the first node 120-132.

In this embodiment, the nodes 120-132 of the artificial neural network 100 can be arranged in layers 110-113, wherein the layers can include an intrinsic order introduced by the edges 140-142 between the nodes 120-132. In particular, edges 140-142 can exist only between neighboring layers of nodes. In the displayed embodiment, there is an input layer 110 comprising only nodes 120-122 without an incoming edge, an output layer 113 comprising only nodes 131, 132 without outgoing edges, and hidden layers 111, 112 in-between the input layer 110 and the output layer 113. In general, the number of hidden layers 111, 112 can be chosen arbitrarily. The number of nodes 120-122 within the input layer 110 usually relates to the number of input values of the neural network, and the number of nodes 131, 132 within the output layer 113 usually relates to the number of output values of the neural network.

In particular, a (real) number can be assigned as a value to every node 120-132 of the neural network 100. Here, $x^{(n)}_i$ denotes the value of the i-th node 120-132 of the n-th layer 110-113. The values of the nodes 120-122 of the input layer 110 are equivalent to the input values of the neural network 100, the values of the nodes 131, 132 of the output layer 113 are equivalent to the output value of the neural network 100. Furthermore, each edge 140-142 can include a weight being a real number, in particular, the weight is a real number within the interval [−1, 1] or within the interval [0, 1]. Here, $w^{(m,n)}_{i,j}$ denotes the weight of the edge between the i-th node 120-132 of the m-th layer 110-113 and the j-th node 120-132 of the n-th layer 110-113. Furthermore, the abbreviation $w^{(n)}_{i,j}$ is defined for the weight $w^{(n,n+1)}_{i,j}$.

In particular, to calculate the output values of the neural network 100, the input values are propagated through the neural network. In particular, the values of the nodes 120-132 of the (n+1)-th layer 110-113 can be calculated based on the values of the nodes 120-132 of the n-th layer 110-113 by $$x_j^{(n+1)} = f\left(\sum_i x_i^{(n)} \cdot w_{i,j}^{(n)}\right)$$

Herein, the function f is a transfer function (another term is "activation function"). Known transfer functions are step functions, sigmoid function (e.g. the logistic function, the generalized logistic function, the hyperbolic tangent, the Arctangent function, the error function, the smooth step function) or rectifier functions. The transfer function is mainly used for normalization purposes.

In particular, the values are propagated layer-wise through the neural network, wherein values of the input layer 110 are given by the input of the neural network 100, wherein values of the first hidden layer 111 can be calculated based on the values of the input layer 110 of the neural network, wherein values of the second hidden layer 112 can be calculated based in the values of the first hidden layer 111, etc.

In order to set the values $w^{(m,n)}_{i,j}$ for the edges, the neural network 100 has to be trained using training data. In particular, training data comprises training input data and training output data (denoted as $t_i$). For a training step, the neural network 100 is applied to the training input data to generate calculated output data. In particular, the training data and the calculated output data comprise a number of values, said number being equal with the number of nodes of the output layer. In particular, a comparison between the calculated output data and the training data is used to recursively adapt the weights within the neural network 100 (backpropagation algorithm). In particular, the weights are changed according to $$w'_{i,j}{}^{(n)} = w_{i,j}{}^{(n)} - \gamma \cdot \delta_j{}^{(n)} \cdot x_i{}^{(n)}$$

wherein $\gamma$ is a learning rate, and the numbers $\delta^{(n)}_j$ can be recursively calculated as $$\delta_j^{(n)} = \left(\sum_k \delta_k^{(n+1)} \cdot w_{j,k}^{(n+1)}\right) \cdot f'\left(\sum_i x_i^{(n)} \cdot w_{i,j}^{(n)}\right)$$

based on $\delta^{(n+1)}{}_j$, if the (n+1)-th layer is not the output layer, and $$\delta_j^{(n)} = \left(x_k^{(n+1)} - t_j^{(n+1)}\right) \cdot f'\left(\sum_i x_i^{(n)} \cdot w_{i,j}^{(n)}\right)$$

if the (n+1)-th layer is the output layer 113, wherein f' is the first derivative of the activation function, and $y^{(n+1)}{}_j$ is the comparison training value for the j-th node of the output layer 113.

In some embodiments, the neural network 100 is configured, or trained, for adaptive digital reinforcement learning. The system is initially pre-trained on mock data-sets imitating a real learner's data set, afterwards the system is further trained on real data sets with known learning outcomes to use as predictive comparators. Finally, the system can be tailored for the user based on their real progress in the application. For example, in some embodiments, the neural network 100 is configured to receive a plurality of digital learning processes and flows and generate a neural network configured to perform adaptive digital reinforcement learning. The system is embedded in the application and upon user request can analyze current conditions in reference to prior performance to generate a recommended lesson for the user.

Figure 6:
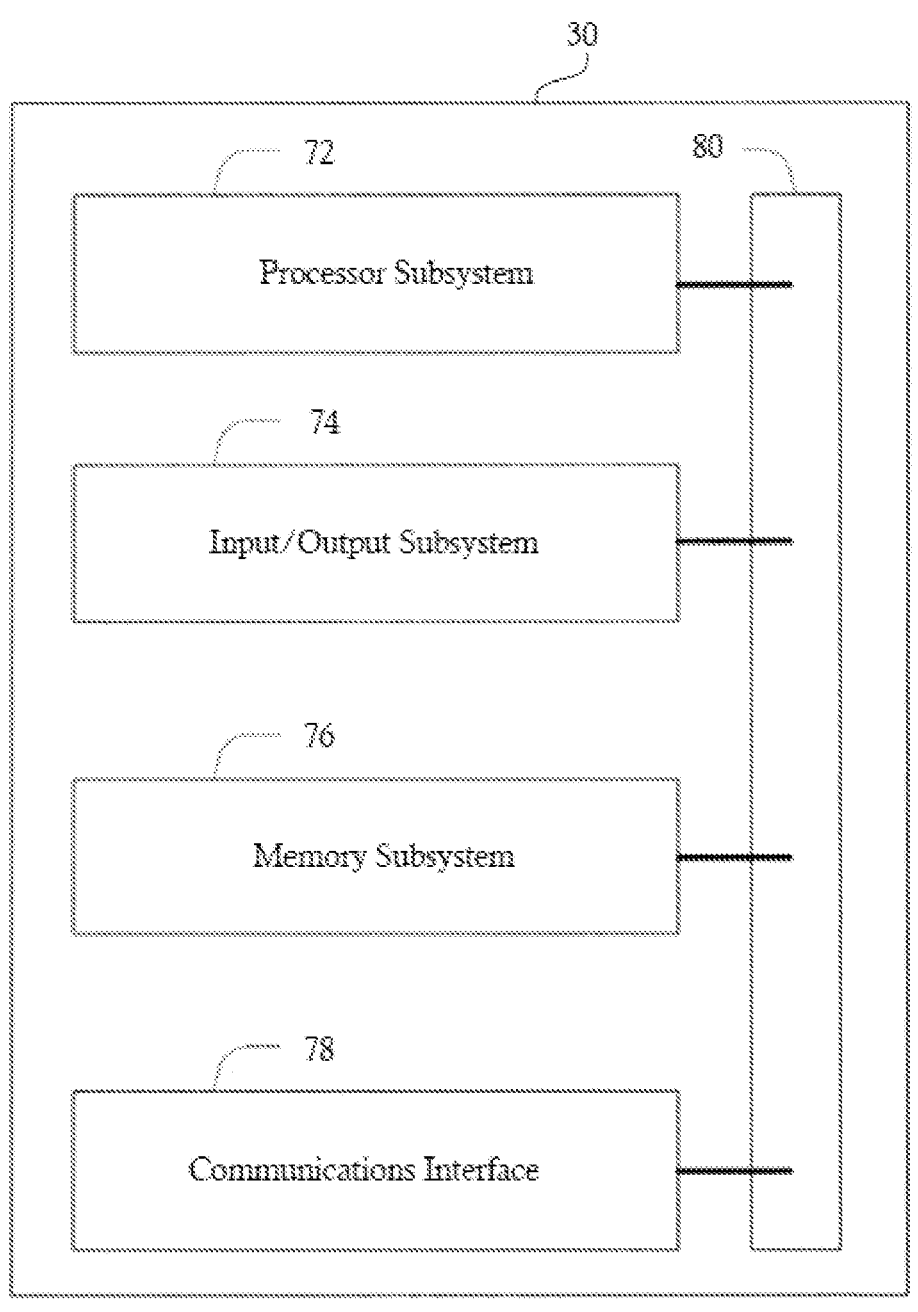
FIG. 6 illustrates a computer system configured to implement one or more processes, in accordance with some embodiments.

FIG. 6 illustrates a computer system 30 configured to implement one or more processes, in accordance with some embodiments. The system 30 is a representative device and can include a processor subsystem 72, an input/output subsystem 74, a memory subsystem 76, a communications interface 78, and a system bus 80. In some embodiments, one or more than one of the system 30 components can be combined or omitted such as, for example, not including an input/output subsystem 74. In some embodiments, the system 30 can include other components not shown in FIG. 6. For example, the system 30 can also include, for example, a power subsystem. In other embodiments, the system 30 can include several instances of a component shown in FIG. 6. For example, the system 30 can include multiple memory subsystems 76. For the sake of conciseness and clarity, and not limitation, one of each component is shown in FIG. 6.

The processor subsystem 72 can include any processing circuitry operative to control the operations and performance of the system 30. In various aspects, the processor subsystem 72 can be implemented as a general purpose processor, a chip multiprocessor (CMP), a dedicated processor, an embedded processor, a digital signal processor (DSP), a network processor, an input/output (I/O) processor, a media access control (MAC) processor, a radio baseband processor, a co-processor, a microprocessor such as a complex instruction set computer (CISC) microprocessor, a reduced instruction set computing (RISC) microprocessor, and/or a very long instruction word (VLIW) microprocessor, or other processing device. The processor subsystem 72 also can be implemented by a controller, a microcontroller, an application specific integrated circuit (ASIC), a field programmable gate array (FPGA), a programmable logic device (PLD), and so forth.

In various aspects, the processor subsystem 72 can be arranged to run an operating system (OS) and various applications. Examples of an OS comprise, for example, operating systems generally known under the trade name of Apple OS, Microsoft Windows OS, Android OS, Linux OS, and any other proprietary or open source OS. Examples of applications include, for example, network applications, local applications, data input/output applications, user interaction applications, etc.

In some embodiments, the system 30 can include a system bus 80 that couples various system components including the processing subsystem 72, the input/output subsystem 74, and the memory subsystem 76. The system bus 80 can be any of several types of bus structure(s) including a memory bus or memory controller, a peripheral bus or external bus, and/or a local bus using any variety of available bus architectures including, but not limited to, 9-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect Card International Association Bus (PCM-CIA), Small Computers Interface (SCSI) or other proprietary bus, or any custom bus suitable for computing device applications.

In some embodiments, the input/output subsystem 74 can include any suitable mechanism or component to enable a user to provide input to system 30 and the system 30 to provide output to the user. For example, the input/output subsystem 74 can include any suitable input mechanism, including but not limited to, a button, keypad, keyboard, click wheel, touch screen, motion sensor, microphone, camera, etc.

In some embodiments, the input/output subsystem 74 can include a visual peripheral output device for providing a display visible to the user. For example, the visual peripheral output device can include a display screen such as, for example, a Liquid Crystal Display (LCD) screen. As another example, the visual peripheral output device can include a movable display or projecting system for providing a display of content on a surface remote from the system 30. In some embodiments, the visual peripheral output device can include a coder/decoder, also known as Codecs, to convert digital media data into analog signals. For example, the visual peripheral output device can include video Codecs, audio Codecs, or any other suitable type of Codec.

The visual peripheral output device can include display drivers, circuitry for driving display drivers, or both. The visual peripheral output device can be operative to display content under the direction of the processor subsystem 72. For example, the visual peripheral output device can be able to play media playback information, application screens for application implemented on the system 30, information regarding ongoing communications operations, information regarding incoming communications requests, or device operation screens, to name only a few.

In some embodiments, the communications interface 78 can include any suitable hardware, software, or combination of hardware and software that is capable of coupling the system 30 to one or more networks and/or additional devices. The communications interface 78 can be arranged to operate with any suitable technique for controlling information signals using a desired set of communications protocols, services or operating procedures. The communications interface 78 can include the appropriate physical connectors to connect with a corresponding communications medium, whether wired or wireless.

Vehicles of communication comprise a network. In various aspects, the network can include local area networks (LAN) as well as wide area networks (WAN) including without limitation Internet, wired channels, wireless channels, communication devices including telephones, computers, wire, radio, optical or other electromagnetic channels, and combinations thereof, including other devices and/or components capable of/associated with communicating data. For example, the communication environments comprise in-body communications, various devices, and various modes of communications such as wireless communications, wired communications, and combinations of the same.

Wireless communication modes include any mode of communication between points (e.g., nodes) that utilize, at least in part, wireless technology including various protocols and combinations of protocols associated with wireless transmission, data, and devices. The points comprise, for example, wireless devices such as wireless headsets, audio and multimedia devices and equipment, such as audio players and multimedia players, telephones, including mobile telephones and cordless telephones, and computers and computer-related devices and components, such as printers, network-connected machinery, and/or any other suitable device or third-party device.

Wired communication modes include any mode of communication between points that utilize wired technology including various protocols and combinations of protocols associated with wired transmission, data, and devices. The points include, for example, devices such as audio and multimedia devices and equipment, such as audio players and multimedia players, telephones, including mobile telephones and cordless telephones, and computers and computer-related devices and components, such as printers, network-connected machinery, and/or any other suitable device or third-party device. In various implementations, the wired communication modules can communicate in accordance with a number of wired protocols. Examples of wired protocols can include Universal Serial Bus (USB) communication, RS-232, RS-422, RS-423, RS-485 serial protocols, FireWire, Ethernet, Fibre Channel, MIDI, ATA, Serial ATA, PCI Express, T-1 (and variants), Industry Standard Architecture (ISA) parallel communication, Small Computer System Interface (SCSI) communication, or Peripheral Component Interconnect (PCI) communication, to name only a few examples.

Accordingly, in various aspects, the communications interface 78 can include one or more interfaces such as, for example, a wireless communications interface, a wired communications interface, a network interface, a transmit interface, a receive interface, a media interface, a system interface, a component interface, a switching interface, a chip interface, a controller, and so forth. When implemented by a wireless device or within wireless system, for example, the communications interface 78 can include a wireless interface comprising one or more antennas, transmitters, receivers, transceivers, amplifiers, filters, control logic, and so forth.

In various aspects, the communications interface 78 can provide data communications functionality in accordance with a number of protocols. Examples of protocols can include various wireless local area network (WLAN) protocols, including the Institute of Electrical and Electronics Engineers (IEEE) 802.xx series of protocols, such as IEEE 802.11a/b/g/n/ac, IEEE 802.16, IEEE 802.20, and so forth. Other examples of wireless protocols can include various wireless wide area network (WWAN) protocols, such as GSM cellular radiotelephone system protocols with GPRS, CDMA cellular radiotelephone communication systems with 1×RTT, EDGE systems, EV-DO systems, EV-DV systems, HSDPA systems, and so forth. Further examples of wireless protocols can include wireless personal area network (PAN) protocols, such as an Infrared protocol, a protocol from the Bluetooth Special Interest Group (SIG) series of protocols (e.g., Bluetooth Specification versions 5.0, 6, 7, legacy Bluetooth protocols, etc.) as well as one or more Bluetooth Profiles, and so forth. Yet another example of wireless protocols can include near-field communication techniques and protocols, such as electro-magnetic induction (EMI) techniques. An example of EMI techniques can include passive or active radio-frequency identification (RFID) protocols and devices. Other suitable protocols can include Ultra Wide Band (UWB), Digital Office (DO), Digital Home, Trusted Platform Module (TPM), ZigBee, and so forth.

In some embodiments, at least one non-transitory computer-readable storage medium is provided having computer-executable instructions embodied thereon, wherein, when executed by at least one processor, the computer-executable instructions cause the at least one processor to perform embodiments of the methods described herein. This computer-readable storage medium can be embodied in memory subsystem 76.

In some embodiments, the memory subsystem 76 can include any machine-readable or computer-readable media capable of storing data, including both volatile/non-volatile memory and removable/non-removable memory. The memory subsystem 76 can include at least one non-volatile memory unit. The non-volatile memory unit is capable of storing one or more software programs. The software programs can contain, for example, applications, user data, device data, and/or configuration data, or combinations therefore, to name only a few. The software programs can contain instructions executable by the various components of the system 30.

In various aspects, the memory subsystem 76 can include any machine-readable or computer-readable media capable of storing data, including both volatile/non-volatile memory and removable/non-removable memory. For example, memory can include read-only memory (ROM), random-access memory (RAM), dynamic RAM (DRAM), Double-Data-Rate DRAM (DDR-RAM), synchronous DRAM (SDRAM), static RAM (SRAM), programmable ROM (PROM), erasable programmable ROM (EPROM), electrically erasable programmable ROM (EEPROM), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk memory (e.g., floppy disk, hard drive, optical disk, magnetic disk), or card (e.g., magnetic card, optical card), or any other type of media suitable for storing information.

In one embodiment, the memory subsystem 76 can contain an instruction set, in the form of a file for executing various methods, such as methods of adaptive digital reinforcement learning, as described herein. The instruction set can be stored in any acceptable form of machine readable instructions, including source code or various appropriate programming languages. Some examples of programming languages that can be used to store the instruction set comprise, but are not limited to: Java, C, C++, C#, Python, Objective-C, Visual Basic, or .NET programming. In some embodiments a compiler or interpreter is comprised to convert the instruction set into machine executable code for execution by the processing subsystem 72.

Each functional component described herein can be implemented in computer hardware, in program code, and/or in one or more computing systems executing such program code as is known in the art. As discussed above with respect to FIG. 6, such a computing system can include one or more processing units which execute processor-executable program code stored in a memory system. Similarly, each of the disclosed methods and other processes described herein can be executed using any suitable combination of hardware and software. Software program code embodying these processes may be stored by any non-transitory tangible medium or memory subsystem 76, as discussed above with respect to FIG. 6.

Although the subject matter has been described in terms of exemplary embodiments, it is not limited thereto. Rather, the appended claims should be construed broadly, to include other variants and embodiments, which may be made by those skilled in the art.

What is claimed is:

1. A method of adaptive reinforcement learning comprising:

creating a parent user account associated with a digital reinforcement learning application of a computing device;

creating a child user account associated with the digital reinforcement learning application;

restricting access to content of the child user account, wherein restricted content includes computer-based applications designated by the parent user account to have restrictions by use of the child user account to the computing device;

providing access to the content on the computing device to a child user of the child user account;

tracking time via the digital reinforcement learning application that the child user account accesses the content;

locking out access to the restricted content of the content when a time threshold of the child user account has expired;

redirecting the content to a learning task provided via the digital reinforcement learning application, the learning task based on progress within a learning curriculum;

automatically adjusting the learning task based on progress within the learning curriculum of the child user; and tracking one of child user progress within the learning curriculum, learning task response time, and learning accuracy rate.

2. The method of claim 1, wherein the restricting access to the content of the child user account is performed via the parent user account.

3. The method of claim 1, wherein the restricting access to the content of the child user account is performed algorithmically.

4. The method of claim 1, further comprising generating a notification to the child user account when the content has been restricted.

5. The method of claim 1, further comprising unlocking access to the restricted content after completion of the learning task.

6. The method of claim 5, wherein the learning task is completed when a predetermined number of questions have been answered via the digital reinforcement learning application.

7. The method of claim 6, wherein the predetermined number of questions is determined based on progress in the curriculum within the digital reinforcement learning application.

8. The method of claim 7, wherein the progress in the curriculum is determined based on efficiency of completion of answered questions in the digital reinforcement learning application.

9. The method of claim 1, wherein the learning task is an error-free learning task where only correct answers to questions is allowed.

10. The method of claim 9, wherein each incorrect answer to a question is sequentially removed until only a correct answer remains.

11. The method of claim 1, further comprising monitoring progress of the learning task to determine a number of times an incorrect answer is removed from a question before a correct answer is selected.

12. The method of claim 1, further comprising analyzing child user data, the child user data including at least one of: time of day learning tasks are completed, learning task length, learning task question types, number of questions of the learning task, and number of possible answers to questions of the learning task.

13. A non-transitory computer-readable storage medium including executable instructions that when executed by a processor cause the processor to perform:

creating a parent user account associated with a digital reinforcement learning application of a computing device;

creating a child user account associated with the digital reinforcement learning application;

restricting access to content of the child user account;

providing access to the content on the computing device to a child user of the child user account;

tracking time via the digital reinforcement learning application that the child user account accesses the content;

locking out access to the restricted content of the content when a time threshold of the child user account has expired;

redirecting the content to a learning task provided via the digital reinforcement learning application, the learning task based on progress within a learning curriculum;

automatically adjusting the learning task based on progress within the learning curriculum of the child user; and tracking one of child user progress within the learning curriculum, learning task response time, and learning accuracy rate.

14. The non-transitory computer-readable storage medium of claim 13, wherein the processor is further caused to perform unlocking access to the restricted content after completion of the learning task.

15. The non-transitory computer-readable storage medium of claim 13, wherein the learning task is an error-free learning task where only correct answers to questions is allowed.

* * * * *